C. A. GRISWOLD.

CORSET.

No. 10,939. Reissued June 19, 1888.

WITNESSES:

C. M. Benjamin

A. T. Fales

INVENTOR.

Catharine A. Griswold.

BY Arden S. Fitch.

Her ATTORNEY.

N. PETERS, Photo-Lithographer, Washington, D. C.

UNITED STATES PATENT OFFICE.

CATHARINE A. GRISWOLD, OF NEW YORK, N. Y.

CORSET.

SPECIFICATION forming part of Reissued Letters Patent No. 10,939, dated June 19, 1888.

Original No. 358,348, dated February 22, 1887. Application for reissue filed December 30, 1887. Serial No. 259,404.

*To all whom it may concern:*

Be it known that I, CATHARINE A. GRISWOLD, of the city, county, and State of New York, and a citizen of the United States, have invented certain new and useful Improvements in Corsets, of which the following is a full, clear, and exact description, reference being had to the accompanying drawings, forming part of this specification.

My invention consists in a corset having re-enforcing strips which have substantially parallel longitudinal edges throughout their length, secured upon the outside of the corset-body and extending from the top or bottom edge thereof in more or less of a curve toward but not beyond the waist-line of the corset, and with both extremities of each strip terminating on one and the same edge of the corset, as hereinafter particularly described.

I employ herein the term "more or less of a curve" in describing the form or direction, individually and singly, on the corset of the specified re-enforcing strips, to signify that each said strip has in it or is formed to describe a substantially gradual turn or reversal of direction.

Figure 1:
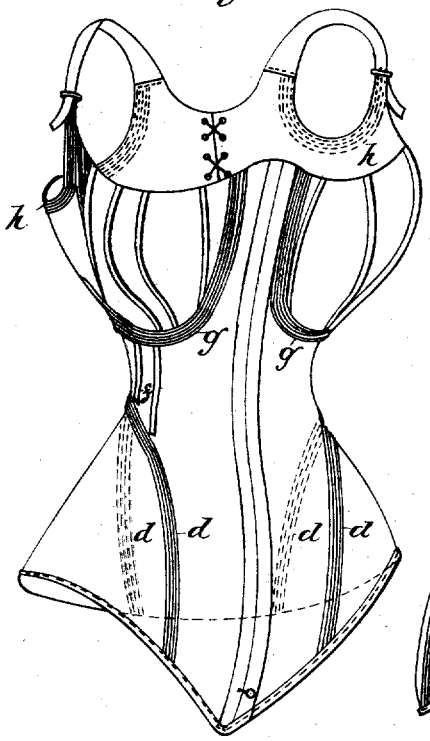
Figure 2:
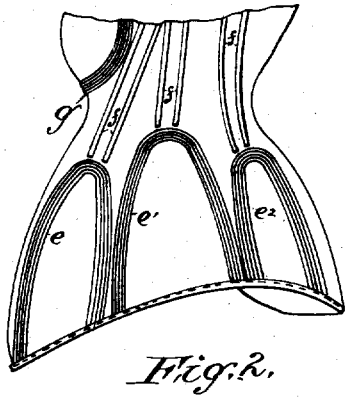
Figure 4:
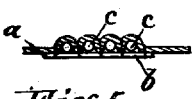
Figure 5:
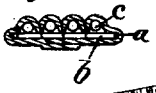
Figure 3:
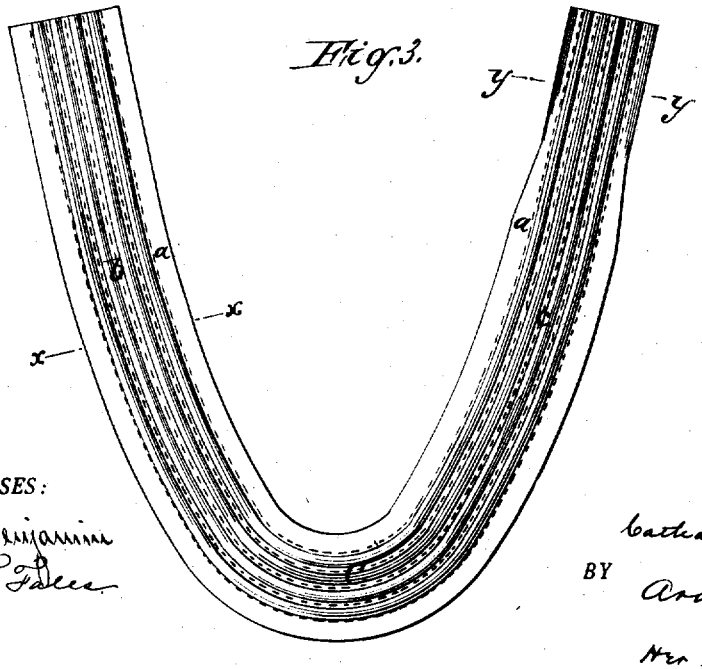

Figure 1 is a front perspective view of a corset containing my invention. Fig. 2 is a side elevation of the lower or hip portion of a corset containing the invention in another form. Fig. 3 is an enlarged view in detail of a re-enforcing strip or piece fabricated in conformity with my invention. Fig. 4 is a cross-section of the strip or piece in Fig. 3 on the line *x x*, and Fig. 5 is a cross section of the same on line *y y*.

In carrying out my invention I form "re-enforcing strips"—such as shown in Fig. 3—having substantially parallel edges, and preferably describing more or less of a curve in outline, in which form they are to be applied to the corset, as hereinafter set forth.

"Re-enforcing strips," as they are technically known in the art of corset-making, are composed of an envelope of cloth or equivalent fabric inclosing a stiffening material.

In the drawings the cloth envelope is shown at *a* with a backing at *b*, and the stiffening material is shown as cords at *c*, the said cords being arranged in parallel lines in the envelope, with rows of stitching between them. The side edges of the top cover, *a*, are turned under the backing and stitched in place. Instead of the cording *c*, strips of metal, bone, wood, or other stiffening material may be employed in connection with the cloth envelope. These re-enforcing strips are fabricated as a distinct structure apart from the corset-body, and are then applied thereto and secured in place thereon. I find it desirable in forming these re-enforcing strips to fabricate them initially in the outline in which they are to be applied to the corset—that is to say, to cut the envelope and also the stiffening material in the outline of the curve which the strips are to have when secured upon the corset-body. The strips will thus retain their outline when affixed to the corset without strain upon the material of the corset-body.

In further carrying out my invention I place these re-enforcing strips, as described, upon the exterior of the corset-body, securing them in place by stitching or other suitable means, and so situated as to extend from the top or bottom edge of the corset-body in more or less of a curve toward but not beyond the waist-line of the corset, and with the extremities of each strip terminating at one and the same edge of the corset-body. Thus I place a strip having a wide curve over the hip portion of the corset, as shown at *d*, Fig. 1, extending from the lower edge at the front upward toward but not beyond the waist-line, and thence downward to the lower edge at the rear; or I place several strips, each having the curve of a semi-ellipse, as shown at *e*, *e'*, and $e^2$, Fig. 2, on the hip portion, each extending upward from the lower edge toward but not beyond the waist-line, and with their apices just at the waist-line, their extremities terminating at the said lower edge. By means of such strips on the hip portion the use of inlaid bones in the body of the corset below the hip, and extending from top to bottom of the corset, as is usual in many corsets, may be dispensed with, and the side bones of the corset may terminate at the waist-line over the hip. Freedom of motion by the wearer in bending the body backward, forward, or sidewise is thus secured, and at the same time the liability to fracture the bones of the corset, as where they extend across the waist-line, is wholly avoided. The strips, applied as described, serve to maintain the lower part of the corset-body, covering the hip, in proper position on the person. I also find it desirable to place a described strip extending from the top edge of the corset on the front around and underneath the breast-swells, as shown at *g*, Fig. 1, with the ends of the strip terminating on the said top edge. Strips thus arranged act to in a measure support the breasts and to give firmness to the corset-body around and beneath the bust.

I have heretofore placed a single thickness of tape upon the exterior of the corset along the waist-line and immediately below the lower ends of the side bones, which terminated above the hip, and have allowed the extremities of this tape to extend to the lower edge of the corset and there be inclosed in the corset-binding. The sole function of this tape, so placed, was to form a bearing for the lower ends of the said short side bones, and the continuance of the ends of the tape to the corset-edge was wholly arbitrary and served no purpose whatever, except to give a better and more attractive finish to the corset than if the ends of the tape terminated on the surface of the corset-body at the waist-line. The tape, placed as described, was by its nature as a fabric incapable of giving any substantial and effective increase of stiffness or rigidity to the corset-body as is secured by means of what is known as a "re-enforcing strip" in the art of corset-making, fabricated as hereinbefore described.

It is my intention to claim herein a corset provided with the described re-enforcing strips located and secured as specified, as distinguished from ordinary tapes or single thicknesses of cloth ribbon, which in corset-making serve a purpose or purposes wholly distinct from the specific structure known as a "re-enforcing strip."

What I claim as my invention, and desire to secure by Letters Patent, is—

A corset provided with the described re-enforcing strips having substantially parallel longitudinal edges secured upon the outside of the corset-body and extending from the top or bottom edge of said body in more or less of a curve over and upon said body and toward but not beyond the waist-line of the corset, and with both extremities terminating at one and the same edge of said corset-body, as and for the purpose set forth.

CATHARINE A. GRISWOLD.

Witnesses:
JOHN J. ENNIS,
WILLIAM LIPPINCOTT.